United States Patent [19]
Long

[11] Patent Number: 4,609,577
[45] Date of Patent: Sep. 2, 1986

[54] METHOD OF PRODUCING WELD OVERLAY OF AUSTENITIC STAINLESS STEEL

[75] Inventor: W. Herbert Long, Monroe, Ohio

[73] Assignee: Armco Inc., Middletown, Ohio

[21] Appl. No.: 690,169

[22] Filed: Jan. 10, 1985

[51] Int. Cl.[4] ............................................. B32B 15/00
[52] U.S. Cl. .................................... 428/683; 428/685; 29/132; 420/56; 420/57; 420/58; 420/59; 420/60; 420/34
[58] Field of Search ............... 29/129.5, 132; 428/683, 428/682, 685, 939, 684; 75/128 A; 228/263.15; 219/146.23, 146.1; 148/38

[56] References Cited
U.S. PATENT DOCUMENTS 3,989,474 11/1976 Goller et al. .................... 428/683
4,482,612 11/1984 Kuroki et al. ................... 428/683
4,499,158 2/1985 Onuma et al. ................... 428/685

Primary Examiner—L. Dewayne Rutledge
Assistant Examiner—Deborah Yee
Attorney, Agent, or Firm—Frost & Jacobs

[57] ABSTRACT

A method of producing a weld overlay on a ferrous base metal surface, by applying to the surface by electric arc welding a plurality of layers of an austenitic stainless steel filler of specific composition, and providing a flux which produces a substantially fully austenitic overlay at least in the uppermost layer. The overlay has improved machinability, metal-to-metal wear resistance and corrosion resistance, and the capability of work hardening.

8 Claims, No Drawings

METHOD OF PRODUCING WELD OVERLAY OF AUSTENITIC STAINLESS STEEL

BACKGROUND OF THE INVENTION

The present invention relates to a method of producing a weld overlay on a ferrous base metal surface, such as a low alloy steel or cast iron, by electric arc welding, and to a product produced by the method such as a steel mill roll, having improved machinability, metal-to-metal wear resistance and corrosion resistance. Although not so limited, the invention has particular utility in the production of or rebuilding of rolls for continuous casting machines, hot strip mill run-out table rolls, boat shafts and equipment for handling mineral materials and coal.

Conventional rolls for uses of the type set forth above comprise a core section of low alloy steel or cast iron having an overlay of ferritic or martensitic stainless steel. AISI Type 420 martensitic stainless steel is widely used for this purpose. The nominal composition of Type 420 is over 0.15% carbon, 1.00% maximum manganese, 1.00% maximum silicon, 0.040% maximum phosphorus, 0.030% maximum sulfur, 12.00% to 14.00% chromium, and balance essentially iron. Martensitic weld overlays include alloys which may be ferritic but are transformed to a substantially fully martensitic structure by appropriate austenitizing heat treatment and cooling.

U.S. Pat. No. 4,404,450 discloses a roll welding machine and a method of reconditioning caster rolls, wherein a Type 420 martensitic stainless steel is applied as an overlay by submerged arc welding. The processing disclosed in this patent includes the conventional steps of preheating the roll to a minimum preheat temperature of 600° F., with the preheating being conducted at a rate of 150° F. per hour. The roll is maintained at the desired temperature of at least 600° F. throughout the welding operation.

U.S. Pat. No. 4,436,791 discloses the production of a cast steel roll comprising a core or heart of nodular or lamellar cast iron and an outer case of martensitic steel having a chromium content of 8% to 16% and a carbon content of 0.65% to 0.95%. The residual austenite content of the case metal is less than 10%, and the hardness of the case exceeds 700 HV. The roll of this patent is produced by casting, followed by an austenitization treatment at a temperature above 900° C. for 8 to 24 hours, cooling in air to a temperature of 400°–500° C., maintaining the temperature for 8 to 24 hours, air cooling to room temperature, and tempering for 8 to 24 hours at a temperature of 400° to 450° C. The case metal is balanced with respect to the carbon and chromium contents so as to reach a slightly hypereutectoid composition which avoids the presence of harmful ledeburitic carbides.

U.S. Pat. No. 4,420,335 discloses a steel for roll materials in continuous casting equipment, comprising 0.04% to 0.20% carbon, 0.2% to 0.8% silicon, 0.4% to 1.5% manganese, 0.2% to 1.0% nickel, 10.0 to 14.0% chromium, 0.5% to 4% copper, 0.1% to 0.5% vanadium, 0.01% to 0.35% niobium (columbium), 0.01% to 0.06% aluminum, phosphorus and sulfur up to 0.03% each, and balance iron. In one exemplary embodiment a weld overlay was applied to a roll core. Good weldability is alleged for the steel compositions disclosed in this patent, particularly after heat treatment for the purpose of hardening by transformation to martensite, and tempering.

Japanese published application 57169-067 discloses a roll having a surface layer of a ferritic steel containing up to 0.1% carbon, 10.0% to 14.0% chromium, 0.4% to 1.0% columbium, and balance iron with usual impurities. Preferably the surface layer is formed by welding, and the layer may contain a small amount of carbide precipitates formed by the columbium addition.

Japanese published application 58193-343-A discloses a composite roll having an outer layer of high chromium graphite cast iron comprising 2.4% to 3.4% carbon, 2.0% to 3.4% silicon, 0.5% to 1.5% manganese, up to 0.08% phosphorus, 4.5% to 10% nickel, 5% to 10% chromium, 0.4% to 1.5% molybdenum, and balance iron. Optionally up to 1.0% total of one or more of columbium and vanadium may be present. The outer layer is applied by welding to a core of cast iron, ductile cast iron or graphite cast steel.

Apparatus for application of weld overlays on shafts is disclosed in U.S. Pat. Nos. 4,322,596 and 4,295,592.

It is clear from the above prior art that the production of new or rebuilt steel mill roll surfaces requires lengthy and expensive preheat treatment, welding under carefully controlled temperature conditions and stress relief heat treatment subsequent to welding. Where a martensitic case or outer layer is used, still further heating and cooling steps of substantial duration are required for transformation of the outer layer to martensite.

A temporary product data bulletin (TPD-3) was published in April, 1983 by the assignee of the present application disclosing the composition, mechanical properties, wear resistance and corrosion resistance of the alloy in other product forms. It suggests possible use as a weld overlay in surface wear applications such as steel mill rolls.

Despite the processing precautions and composition limitations disclosed in the above prior art publications, steel mill rolls presently available frequently exhibit inadequate metal-to-metal wear resistance, crack propagation resistance and corrosion resistance.

SUMMARY OF THE INVENTION

It is an object of the present invention to provide a method of producing a weld overlay on a low carbon ferrous base metal surface without preheating and without post-weld heat treatment.

It is a further object of the invention to provide a steel mill roll having an annular outer section of an austenitic stainless steel exhibiting improved machinability, metal-to-metal wear resistance, and corrosion resistance in comparison to ferritic and martensitic surfaces.

While the weld overlay in accordance with the present invention is softer as welded than a ferritic or martensitic overlay, the substantially fully austenitic microstructure work hardens when placed in service, and the composition is selected so as to avoid thermal transformation resulting from the temperatures encountered during service.

According to the invention there is provided a method of producing a weld overlay on a ferrous base metal surface, comprising the steps of applying to the ferrous base metal surface by electric arc welding a plurality of layers of an austenitic stainless steel filler consisting essentially of, in weight percent, from about 0.015% to about 0.10% carbon, about 6.0% to about 10.0% manganese, about 2.0% maximum silicon, about 0.06% maximum phosphorus, about 0.06% maximum sulfur, about 13.0% to about 20.0% chromium, about 1.0% to less than 3.5% nickel, up to about 0.9% copper, up to about 1% molybdenum, 0.12% to 0.22% nitrogen, and the balance essentially iron, the austenitic stainless steel having an instability factor ranging from 4.0 to 8.2 calculated by the equation:

Instability factor=37.2—51.25 (%C)—2.59 (%Ni)—1.02 (%Mn)—0.47 (%Cr)—34.4 (%N)—3 (%Cu); and providing a flux which reacts with the austenitic steel filler when molten to produce at least in the uppermost of the layers a substantially fully austenitic overlay; whereby to produce an overlay having improved machinability, metal-to-metal wear resistance, and corrosion resistance in comparison to ferritic and martensitic overlays, and the capability of work hardening.

The present invention further provides a composite article comprising a core section of ferrous base metal and an outer section of a plurality of fused layers deposited by electric arc welding of an austenitic stainless steel filler which, prior to welding, consists essentially of, in weight percent, from about 0.015% to about 0.10% carbon, about 6.0% to about 10.0% manganese, about 2.0% maximum silicon, about 0.06% maximum phosphorus, about 0.05% maximum sulfur, about 13.0% to about 20.0% chromium, about 1.0% to less than 3.5% nickel, up to about 0.9% copper, 0.12% to 0.22% nitrogen, and balance essentially iron, the austenitic stainless steel having an instability factor ranging from about 4 to 8.2 calculated by the equation:

Instability factor=37.2—51.25 (%C)—2.59 (%Ni)—1.02 (%Mn)—0.47 (%Cr)—34.4 (%N)—3 (%Cu), at least the uppermost of the layers being substantially fully austenitic.

A preferred embodiment of a composite article as defined above is a steel mill roll.

DETAILED DESCRIPTION

It is a significant advantage of the method of the present invention that preheating of a roll or other low carbon ferrous base shape such as a boat propeller shaft is not required before the welding operation and that no post-weld stress relief heat treatment or martensite transformation heat treatment are required. By use of an appropriate flux of a type hereinafter disclosed, it has been found to be possible to apply an austenitic stainless steel filler having initially the composition ranges set forth above either in the form of solid or cored strip or wire and to obtain a satisfactory weld overlay without preheating or post-weld stress relieving. This represents a substantial saving in processing costs, on the order of about 35% less than the comparable cost for a Type 420 martensitic stainless steel overlay, calculated on the basis of the same roll service life. This takes into consideration the lower cost of the austenitic stainless steel filler as compared to the market price of Type 420 martensitic stainless steel.

One of the most severe environments to which steel mill rolls are subjected is in continuous casting, wherein the rolls are subjected to high temperature, bending stresses, and cooling water sprays which are converted to steam. Under these conditions thermal fatigue causes radial surface cracks on the roll from which side cracks form. Cooling water entrapment in the thermal fatigue cracks and conversion to steam during each revolution of the roll contribute to crack propagation and enlargement. Side cracks off the main radial cracks (principally in the second weld overlay) link together and cause spalling of the roll surface after about four months of service. Rolls produced in accordance with the method of the present invention have not overcome these problems, which are also prevalent with conventional rolls, but in less severe service conditions where thermal fatigue is not encountered, rolls of the present invention are at least equal in service life to those of the prior art. It is of course known that the coefficient of thermal expansion of an austenitic stainless steel is higher than that of a martensitic stainless steel and that of base metal such as a low alloy steel. Where exposure to extremely high temperature is avoided, this differential in thermal expansion does not contribute to crack propagation. The present invention thus cannot be considered to have solved the problem of crack propagation resulting from thermal fatigue under the most adverse conditions of use. However, in other less critical applications the method and product of the invention provide numerous advantages described in detail hereinafter.

In the method of this invention a plurality of weld layers is deposited, ordinarily two to four, resulting in an annular outer section of from about ½ to about 1 inch in thickness. The first weld layer which is deposited will transform to a martensitic structure when the interpass temperature goes below 121° C. because of weld metal dilution by the base metal. This transformation is allowed to occur in order that the higher temperature associated with subsequent weld passes will stress relieve the martensitic first layer. Each subsequent pass or layer will contain less martensite because of decreasing base metal dilution effects, until by the third layer no martensite is formed, and a post-weld heat treatment is then not needed.

A preferred austenitic stainless steel filler composition consists essentially of, in weight percent, from about 0.02% to 0.06% carbon, about 6.0% to about 9.0% manganese, about 1.0% maximum silicon, about 0.06% maximum phosphorus, about 0.06% maximum sulfur, about 13.0% to about 17.0% chromium, about 1.0% to less than 3.0% nickel, 0.25% to about 0.85% copper, 0.12% to 0.22% nitrogen, and balance essentially iron.

For the preferred composition, optimum results are obtained by observing a balancing of the essential elements carbon, manganese, chromium, nickel, copper and nitrogen in such manner that the steel has a nickel equivalent ranging from about 8.5 to about 15 calculated by the formula:

%Ni+30 (%C)+0.5 (%Mn)+30 (%N)+0.5 (%Cu), and a chromium equivalent ranging from about 15 to about 18 calculated by the formula:

%Cr+%Mo+1.5 (%Si).

Any one or more of the preferred ranges indicated above can be used with any one or more of the broad ranges for the remaining elements set forth above.

The practice of the present invention involves a critical balancing of the proportions of essential elements in order to obtain austenite stability of a degree such that transformation to thermal martensite upon cooling is avoided, at least in the outermost layer of the overlay. Thermal martensite is undesirable because the higher hardness and lower ductility increases machining time.

The instability factor defined above is a quantitative calculation which indicates the tendency of austenite microstructures to transform to deformation martensite with cold working. It will be understood that a ferritic microstructure does not transform to martensite with cold working. A correlation exists between the instability factor and the amount of martensite formed during cold deformation. Since transformation to martensite occurs when a roll is subjected to cold working, it is important that the instability factor of the austenitic stainless steel filler be within the range of 4.0 to 8.2.

Carbon is a strong interstitial strengthening element and increases the cold work hardened strength level. A minimum of about 0.015%, preferably about 0.02%, is desirable for these purposes. A broad maximum of about 0.10%, preferably about 0.06%, must be observed since carbon in excess of such levels adversely affects intergranular and pitting corrosion resistance in the as-welded condition.

Manganese is essential as a partial replacement for nickel as an austenite stabilizer and to increase nitrogen solubility. A minimum of about 6.0% is necessary. A maximum of about 10.0%, preferably about 9.0%, should be observed since higher levels reduce the work hardening rate.

Chromium is essential for its usual function of imparting corrosion resistance, and a minimum of about 13.0% is essential for this purpose. A maximum of about 20.0%, preferably about 17.0%, must be observed in order to balance the ferrite-forming potential in relation to the austenite-forming potential of the elements carbon, manganese, nickel, copper and nitrogen. In addition, chromium in excess of the preferred maximum of 17.0%, and certainly in excess of the broad maximum of 20.0%, lowers the work hardening rate.

Nickel is essential as an austenite former, and a broad and preferred minimum of about 1.0% is necessary for this function. A maximum of less than 3.5% cannot be exceeded in view of the adverse effect of higher nickel levels on the work hardening rate and consequent work hardened strength levels. It is also desirable to maintain the nickel content at the lowest possible level in view of its high cost.

Copper is ordinarily present as an impurity in residual amounts, and a preferred minimum of 0.25% should be present as a partial replacement for nickel. However, a maximum of 0.9% must be observed since copper has a strong effect in reducing the work hardening rate.

Nitrogen is essential for its strong austenite forming potential and interstitial strengthening effect, and a broad and preferred minimum of 0.12% nitrogen provides improved pitting corrosion resistance. A broad and preferred maximum of 0.22% should be observed in order to maintain the balance between the nickel equivalent and chromium equivalent elements and to avoid exceeding the solubility limit of nitrogen in the steel.

Silicon is a strong ferrite former, and a broad maximum of about 2.0%, preferably about 1.0%, should be observed in order to preserve the austenite-ferrite balance.

Phosphorus and sulfur are present as normally occurring impurities, and a broad and preferred maximum of about 0.06% of each can be tolerated without adverse effects.

Molybdenum is also normally present as an impurity and can be purposefully added in amounts up to about 1.0% for its usual functional improving pitting corrosion resistance.

The austenitic stainless steel filler can be overlaid on the low alloy steel or a cast steel, as will be apparent from the prior art referred to previously. Preferably a low alloy steel is used, such as AISI 8620, having a composition ranging from 0.18% to 0.23% carbon, 0.70% to 0.90% manganese, 0.040% maximum phosphorus, 0.040% sulfur, 0.20% to 0.35% silicon, 0.40% to 0.70% nickel, 0.40% to 0.60% chromium, 0.15% to 0.25% molybdenum, and balance essentially iron.

It is preferred to apply the austenitic stainless steel weld overlays by submerged arc welding using a flux which is compatible with it. Tests have indicated that fluxes sold under the trademarks HOBART HT-1000, LINCOLN ST-300, LINCOLN ST-100 and HOBART HS-300 are suitable. The compositions of these fluxes are proprietary and hence unknown. The principal problem with a flux is attaining ease of slag removal and good weld bead appearance.

Good results have been obtained with the following conditions:
  Electrode size: 30 mm×0.75 mm (1 1/5×0.03 inch)
  Current: 500–1000 amps DCRP, preferably about 750 amps
  Voltage: 21–30 volts, preferably 22–25 volts (variable voltage more preferred)
  Surface travel speed: 7.5–63.5 cm/min, (3 to 25 in/min), preferably 25.5–38.0 cm/min
  SAW flux used: Hobart HT-1000
  Base metal: AISI 8620
  Preheat temperature: 21° C. (70° F.) (or ambient)
  Interpass temperature 121° C. (250° F.) maximum between 1st and 2nd layers. None for subsequent layers.
  Bead height: 0.25–0.32 cm (3/32–⅛ inch)
  Bead width: 3.17–3.5 cm (1¼–1¾ inch)
  Bead overlap: 0.64 cm (¼ inch)

The advantages provided by the method of the present invention include the following:

No preheat is required prior to welding if low C levels exist in the roll. Higher carbon levels in the roll may be used with preheating.

No post-weld stress relief treatment is required if low C levels exist in the roll. With higher carbon levels, however, post-weld stress relief may be necessary.

It is possible to repair welding defects without heat treatment.

Corrosion resistance is improved in comparison to ferritic and martensitic overlays.

Improved metal-to-metal wear resistance is obtained.

Lower post-weld machining costs are involved.

In connection with the last advantage, it has been found that machining time is reduced by about ⅓ because the as-deposited hardness of the austenitic stainless steel overlay is lower than that of stress relieved Type 420 martensitic stainless steel. Stress relieving is necessary for martensitic overlays.

A comparison of wear resistance of a weld overlay of the austenitic stainless steel of the present invention with Type 420 martensitic stainless steel has been conducted. A strip electrode was used having a thickness of 0.03 inch and width of 1.18 inch. The composition of the strip electrode was 0.040% carbon, 7.72% manganese, 0.48% silicon, 0.024% phosphorus, 0.015% sulfur, 15.62% chromium, 2.82% nickel, 0.53% copper, 0.17% nitrogen, 0.21% molybdenum, and balance iron. Specimens were EDM machined with AISI 8620 plate as the substrate or core metal. A Taber Met-Abrader was used, and the tests were conducted on the EDM machined surfaces. Type 17-4 PH (Condition H900) was used as a mating rotating specimen. This alloy was selected since it is very sensitive to wear and shows the difference in wear rates very easily. Tests were run on both the first weld layer (higher dilution with some consequent transformation to martensite) and the top weld layer as-deposited. Results are summarized in Table I and indicate that the steel of the present invention is superior to Type 420 in wear resistance. The specific test conditions are set forth in Table I.

The steel of the invention outperformed the tempered Type 420 by a wide margin. The as-deposited Type 420 showed the best results, but its hardness of HRC 59 was substantially above the typical HRC 50 for this grade. It should be noted that high hardness makes machining more difficult and increases the tendency to crack.

A study of the effectiveness of various fluxes and their effects on the composition of the deposited metal has also been carried out, and results are summarized in Tables II and III, using a steel of the invention.

It is apparent from Table III that the composition of the top weld layer may differ substantially from that of the strip electrode (filler), particularly with respect to the manganese and chromium contents. The composition of the top weld layer and the chromium and nickel equivalents thereof are considered to be within the scope of the invention. The substantially fully austenitic stainless steel of the top weld layer consists essentially of, in weight percent, from about 0.015% to about 0.10% carbon, about 3.0% to about 10.0% manganese, about 2.0% maximum silicon, about 0.06% maximum phosphorus, about 0.06% maximum sulfur, about 11% to about 20% chromium, about 1.0% to less than 3.5% nickel, up to about 0.9% copper, up to about 1% molybdenum, about 0.10% to 0.22% nitrogen, and balance essentially iron. Preferably the chromium equivalent of the top layer ranges from about 14 to about 19 calculated by the formula hereinabove, while the nickel equivalent ranges from about 8.5 to about 14 calculated by the formula hereinabove. The instability factor should be above 4.0 calculated by the equation hereinabove.

It will be noted that both direct current reverse polarity (DCRP) and direct current straight polarity (DCSP) were tested, and it was concluded that direct current reverse polarity was preferred.

From the above description, it will be clear that the method of the present invention can be utilized to produce a steel mill roll comprising a ferrous base core section which could be carbon steel, low alloy steel, cast iron, or stainless steel, and an annular outer section of a plurality of fused layers deposited by electric arc welding, at least the top or outer layer being austenitic. A nickel base alloy may be required for the initial overlay when the ferrous base is cast iron. Similarly, the method can be used to rebuild used steel mill rolls which have deteriorated as a result of wear and cracking. This would involve the preliminary steps of machining cracks to provide tapered cavities and filling the "cavities" with the austenitic stainless steel (or with any cost effective material compatible with the base metal) prior to overlaying layers of the stainless steel of the invention by electric arc welding.

It is also within the scope of the invention to provide rolls or other fabricated articles wherein the core section is comprised of the austenitic stainless steel of the present invention, which may be fabricated into the desired configuration by casting, hot working and machining.

TABLE I

WEAR RESISTANCE

Electrode composition: 0.04% C, 7.72% Mn, 0.48% Si, 0.024% P, 0.015% S, 15.62% Cr, 2.82% Ni, 0.53% Cu, 0.17% N, 0.21% Mo, balance Fe

|     | Material | Condition | Weld Location | Wear (mg/1000 cycles) | Hardness (R) |
| --- | --- | --- | --- | --- | --- |
| (A) | Ferrous Base | | | | |
|     | AISI 8620 | Wrought | Not Applicable | 23.59 | B76 |
|     | AISI 8620 | Wrought | Not Applicable | 21.58 | B80 |
| (B) | Strip Overlay of Invention | Wrought (Annealed) | Not Applicable | 1.56 | B93 |
| (C) | Weld | | | | |
|     | Invention | As-deposited | Top Layer | 3.66 | — |
|     | Invention | As-deposited | Top Layer | 3.38 | — |
|     | Invention | As-deposited | Top Layer | 3.74 | — |
|     | Invention | As-deposited | Top Layer | 2.02 | C24 |
|     | T420 | As-deposited | Top Layer | .14 | C59 |
|     | T420 | Tempered 1150 | Top Layer | 7.24 | C34 |
|     | Invention | As-deposited | First Layer | 3.78 | — |
|     | Invention | As-deposited | First Layer | 2.16 | — |
|     | Invention | As-deposited | First Layer | 2.31 | — |

Test Conditions 17-4 PH (H900) was rotated against the stationary test material. Taber Met-Abrader Wear Machine, Crossed Cylinder (.5" φ), 16 lbs. load, 105 RPM, 10,000 cycles, nonlubricated, room temperature.

TABLE II

FLUX EVALUATIONS

| Trial Number | 1 | 2 | 3 | 4 | 5 | 6 |
| --- | --- | --- | --- | --- | --- | --- |
| Flux Used | Lincoln ST-300 | Lincoln ST-300 | Hobart HS-300 | Hobart HT-1000 | Lincoln ST-100 | Hobart HT-1000 |
| Polarity | DCSP | DCRP | DCSP | DCSP | DCRP | DCRP |
| Weld Layer | 1 | 1 | 1 | 2 | 4 | 4 |
| Slag Removal | fair | fair | fair | fair | fair | fair |
| Weld Porosity | none | none | none | none | none | none |

TABLE III

| | | | | | | WELD METAL COMPOSITION | | | | | | | |
|---|---|---|---|---|---|---|---|---|---|---|---|---|---|
| | Trial | % C | % Mn | % P | % S | % Si | % Cr | % Ni | % Mo | % Cu | % N | Cr Equiv. | Ni Equiv. |
| Strip Electrode | | .05 | 7.58 | .026 | .014 | .51 | 15.49 | 2.91 | .22 | .55 | .17 | 16.5 | 13.6 |
| Flux | | | | | | | | | | | | | |
| Lincoln ST-300 | 1 | .055 | 5.11 | .025 | .011 | .83 | 13.54 | 2.58 | .22 | .48 | .13 | 15.0 | 10.9 |
| Lincoln ST-300 | 2 | .061 | 4.54 | .023 | .011 | .89 | 12.86 | 2.45 | .21 | .46 | .12 | 14.4 | 10.4 |
| Hobart HS-300 | 3 | .061 | 4.96 | .028 | .011 | .74 | 13.43 | 2.48 | .21 | .47 | .13 | 14.8 | 10.9 |
| Hobart HT-1000 | 4 | .043 | 5.42 | .036 | — | 1.05 | 15.17 | 2.96 | .21 | .55 | .14 | 17.0 | 11.4 |
| Lincoln ST-100 | 5 | .05 | 6.45 | .039 | — | .90 | 16.31 | 2.94 | .21 | .63 | .16 | 17.9 | 12.8 |
| Hobart HT-1000 | 6 | .042 | 5.65 | .032 | — | .90 | 15.33 | 2.92 | .21 | .62 | .16 | 16.9 | 12.1 |

What is claimed is:

1. A composite article comprising a core section of ferrous base metal and an outer section of a plurality of fused layers deposited by electric arc welding of an austenitic stainless steel filler which, prior to welding, consists essentially of, in weight percent, from about 0.015% to about 0.10% carbon, about 6.0% to about 10.0% manganese, about 2.0% maximum silicon, about 0.06% maximum phosphorus, about 0.06% maximum sulfur, about 13.0% to about 20.0% chromium, about 1.0% to less than 3.5% nickel, up to about 0.9% copper, up to about 1% molybdenum, 0.12% to 0.22% nitrogen, and balance essentially iron, said austenitic stainless steel having an instability factor ranging from about 4 to 8.2 calculated by the equation:

Instability factor = 37.2 − 51.25 (%C) − 2.59 (%Ni) − 1.02 (%Mn) − 0.47 (%Cr) − 34.4 (%N) − 3 (%Cu), at least the uppermost of said layers being substantially fully austenitic.

2. A steel mill roll comprising a core section of low alloy steel, and an annular outer section of a plurality of fused layers deposited by electric arc welding of an austenitic stainless steel filler which, prior to welding, consists essentially of, in weight percent, from about 0.015% to about 0.10% carbon, about 6.0% to about 10.0% manganese, about 2.0% maximum silicon, about 0.06% maximum phosphorus, about 0.06% maximum sulfur, about 13.0% to about 20.0% chromium, about 1.0% to less than 3.5% nickel, up to about 0.9% copper, up to about 1% molybdenum, 0.12% to 0.22% nitrogen, and balance essentially iron, said austenitic stainless steel having an instability factor ranging from about 4 to 8.2 calculated by the equation:

Instability factor = 37.2 − 51.25 (%C) − 2.59 (%Ni) − 1.02 (%Mn) − 0.47 (%Cr) − 34.4 (%N) − 3 (%Cu), at least the uppermost of said layers being substantially fully austenitic.

3. The steel mill roll claimed in claim 2, wherein said annular outer section is from about ½ to about 1 inch (about 1.27 to about 2.54 cm) in thickness.

4. The steel mill roll claimed in claim 2, wherein said austenitic stainless steel filler consists essentially of from about 0.02% to 0.06% carbon, about 6.0% to about 9.0% manganese, about 1.0% maximum silicon, about 0.06% maximum phosphorus, about 0.06% maximum phosphorus, about 0.06% maximum sulfur, about 13.0 to about 17.0% chromium, about 1.0% to less than 3.0% nickel, 0.25% to about 0.85% copper, 0.12% to 0.22% nitrogen, and balance essentially iron.

5. The steel mill roll claimed in claim 4, wherein said austenitic stainless steel filler has a nickel equivalent ranging from about 8.5 to about 15 calculated by the formula:

%Ni + 30 (%C) + 0.5 (%Mn) + 30 (%N) + 0.5 (%Cu), and a chromium equivalent ranging from about 15 to about 18 calculated by the formula:

% Cr + % Mo + 1.5 (%Si).

6. A composite article comprising a core section of ferrous base metal and an outer section of a plurality of fused layers deposited by electric arc welding of an austenitic stainless steel filler, the top layer of the weld consisting essentially of, in weight percent, from about 0.015% to about 0.10% carbon, about 3.0% to about 10.0% manganese, about 2.0% maximum silicon, about 0.06% maximum phosphorus, about 0.06% maximum phosphorus, about 0.06% maximum sulfur, about 11% to about 20% chromium, about 1.0% to less than 3.5% nickel, up to about 0.9% copper, up to about 1% molybdenum, about 0.10% to 0.22% nitrogen, and balance essentially iron.

7. The article claimed in claim 6, wherein said top weld layer is substantially fully austenitic and has a nickel equivalent ranging from about 8.5 to about 14 calculated by the formula:

% Ni + 30(% C) + 0.5 (% Mn) + 30 (% N) + 0.5 (% Cu), and a chromium equivalent ranging from about 14 to about 19 calculated by the formula:

% Cr + % Mo + 1.5 (% Si).

8. The article claimed in claim 6 or 7, comprising a steel mill roll.

* * * * *